United States Patent [19]

Liang et al.

[11] Patent Number: 4,477,602
[45] Date of Patent: Oct. 16, 1984

[54] NOVEL SYSTEM FOR THE PRODUCTION OF POLYURETHANES

[75] Inventors: Tai-Ming Liang, Pittsburgh; Keith G. Spitler, Bethel Park, both of Pa.

[73] Assignee: Mobay Chemical Corporation, Pittsburgh, Pa.

[21] Appl. No.: 517,087

[22] Filed: Jul. 25, 1983

[51] Int. Cl.³ .............................................. C08G 18/14
[52] U.S. Cl. .................................... 521/137; 252/182; 252/308; 521/176; 524/757; 524/761
[58] Field of Search ................ 521/137, 176; 524/757, 524/761; 252/182, 308

[56] References Cited

U.S. PATENT DOCUMENTS

| | | | |
|---|---|---|---|
| 3,325,421 | 6/1967 | Muller | 252/308 |
| 4,042,537 | 8/1977 | Dahm et al. | 521/128 |
| 4,089,835 | 5/1978 | König et al. | 252/308 |
| 4,293,470 | 10/1981 | Cuscurida | 528/49 |
| 4,296,213 | 10/1981 | Cuscurida et al. | 521/163 |
| 4,374,209 | 2/1983 | Rowlands | 521/116 |

Primary Examiner—Maurice J. Welsh
Attorney, Agent, or Firm—Gene Harsh; Joseph C. Gil; Aron Preis

[57] ABSTRACT

The present invention is directed to a polyol blend comprising a polyether polyol having at least two and no more than three hydroxyl groups and from about 5 to about 40 percent by weight based on the total weight of the two components of a dispersion of a polyurea and/or polyhydrazodicarbonamide in an organic compound containing at least one hydroxyl group, the solids content of said blend being from about 1 to about 8 percent by weight. The polyol blend is useful in the production of polyurethane products.

23 Claims, No Drawings

NOVEL SYSTEM FOR THE PRODUCTION OF POLYURETHANES

BACKGROUND OF THE INVENTION

Systems are commercially available which are used in the production of polyurethane shoe soles. In general, these systems comprise a polyether diol, a polyether triol, a chain extender (such as 1,4-butanediol or ethylene glycol), blowing agent, catalyst and surfactant. When mixed with an isocyanate, these systems yield polyurethane products which have met with some commercial success. The amounts of triol and chain extender are generally chosen to give the best balance of green strength and low temperature flex-fatigue resistance. Although the systems have met with some success, they do suffer certain disadvantages. Specifically, it is possible to increase the low temperature flex-fatigue resistance, but the green strength of the product upon removal from the mold will then suffer. Similarly, it is possible to enhance the green strength, but the low temperature flex-fatigue resistance will suffer. Finally, known systems can only be used over relatively narrow isocyanate indices (e.g., from 98 to 100).

Dispersions of polyureas and/or polyhydrazodicarbonamides in organic compounds containing at least one hydroxyl group are known and are used extensively in the flexible foam area (see, e.g., U.S. Pat. Nos. 3,325,421; 4,042,537; 4,089,835; 4,293,470; 4,296,213; and 4,374,209).

DESCRIPTION OF THE INVENTION

The present invention is directed to the discovery of a system which will allow for the production of materials having both low temperature flex-fatigue resistance and green strength superior to those currently known and used in the art. Additionally, the system of the present invention is not as sensitive to the isocyanate index, i.e., the system allows for the use of a broader isocyanate index range than known systems to attain the improved results herein. Other properties such as hardness, tensile strength and tear strength are at least equal to those obtained from conventional systems.

The invention is thus broadly directed to a polyurethane product, the process of its manufacture, a novel polyol blend for use therein, and a novel blend to be used as the B-side of a polyurethane system.

More particularly, the present invention is directed to a polyurethane product formed by reacting:

(a) an isocyanate selected from the group consisting of 4,4'-diisocyanatodiphenylmethane, isocyanates based on 4,4'-diisocyantodiphenyl methane, and mixtures thereof, (b) at least one polyether polyol having at least two and no more than three hydroxyl groups, (c) from about 5 to about 40 percent by weight, based on the total weight of components (b) and (c) of a dispersion of a polyurea and/or a polyhydrazodicarbonamide in an organic compound containing at least two hydroxyl groups, and wherein the total solids content of the mixture of component (b) and component (c) is from about 1 to about 8 percent by weight, and (d) from about 5 to 15 percent by weight, based on the total weight of components (b), (c) and (d) of a compound selected from the group consisting of ethylene glycol, 1,4-butanediol and mixtures thereof, in the presence of (e) a blowing agent, and optionally, catalyst and a surfactant, wherein the amount of component (a) is such that the isocyanate index is from about 94 to about 105.

The present invention is also directed to a process of producing a polyurethane product comprising reacting:

(a) an isocyanate selected from the group consisting of 4,4'-diisocyanatodiphenyl methane, isocyanates based on 4,4'-diisocyanatodiphenyl methane, and mixtures thereof, (b) at least one polyether polyol having at least two and no more than three hydroxyl groups, (c) from about 5 to about 40 percent by weight, based on the total weight of components (b) and (c) of a dispersion of a polyurea and/or polyhydrazodicarbonamide in an organic compound containing at least two hydroxyl groups, and wherein the solids content of the mixture of component (b) and component (c) is from about 1 to about 8 percent by weight, and (d) from about 5 to about 15 percent by weight, based on the total weight of components (b), (c) and (d) of a compound selected from the group consisting of ethylene glycol, 1,4-butanediol and mixtures thereof, in the presence of (e) a blowing agent, and optionally, catalyst and a surfactant, wherein the amount of component (a) is such that the isocyanate index is from about 94 to about 105.

The invention is also directed to a polyol blend comprising.

(b) at least one polyether polyol having at least two and no more than three hydroxyl groups, (c) from about 5 to about 40 percent by weight, based on the total weight of components (b) and (c) of a dispersion of a polyurea and/or polyhydrazodicarbonamide in an organic compound containing at least two hydroxyl groups, said blend containing from about 1 to about 8 percent by weight solids. The invention is also directed to a blend which can be used as the B-side of a polyurethane system, comprising (b) at least one polyether polyol having at least two and no more than three hydroxyl groups, (c) from about 5 to about 40 percent by weight, based on the total weight of components (b) and (c) of a dispersion of a polyurea and/or a polyhydrazodicarbonamide in an organic compound containing at least two hydroxyl groups and wherein the total solids content of the mixture of component (b) and component (c) is from about 1 to about 8 percent by weight, and (d) from about 5 to 15 percent by weight, based on the total weight of components (b), (c) and (d) of a compound selected from the group consisting of ethylene glycol, 1,4-butanediol and mixtures thereof, (e) a blowing agent, and optionally, catalyst and a surfactant.

The isocyanates used as starting component (a) according to the present invention are 4,4'-diisocyanatodiphenylmethane, isocyanates based on 4,4'-diisocyanatodiphenylmethane, and mixtures thereof. Specifically excluded are the polyphenylpolymethylene polyisocyanates which may be obtained by anilineformaldehyde condensation followed by phosgenation, and which contain more than 10 percent by weight of isocyanates having a functionality of 3 or more.

From a practical standpoint, it is preferred that the isocyanate be liquid at room temperature. The presently preferred isocyanates are liquid polyisocyanates having urethane groups, which may be obtained by reacting one mole of 4,4'-diisocyanatodiphenyl methane with from 0.05 to 0.3 moles of low molecular weight diols or triols, preferably with polypropylene glycols having molecular weights below 700 (see e.g., U.S. Pat. No. 3,644,457). Also useful are liquid partially carbodiimidized 4,4'-diisocyanatodiphenylmethanes of the type described in U.S. Pat. Nos. 3,152,162 and 4,154,752.

The quantity of isocyanate (component (a)) used in the present invention is calculated so that the total mixture of all the components has an isocyanate index of from about 94 to about 105. By "isocyanate index" is meant the quotient of the number of isocyanate groups and the number of groups which are reactive with isocyanates multiplied by 100.

The compounds used as component (b) in the present invention are polyether polyols having at least two and no more than three hydroxyl groups. The polyethers useful herein preferably have molecular weights of from 1800 to 12000 and most preferably from 3000 to 7000. As is known in the art, such polyethers may be prepared, e.g., by polymerization of epoxides such as ethylene oxide, propylene oxide, butylene oxide, tetrahydrofuran, styrene oxide or epichlorohydrin, either on their own, e.g., in the presence of $BF_3$, or by a process of chemical addition of these epoxides, optionally as mixtures or successively, to starting components having reactive hydrogen atoms such as water, ammonia or alcohols. Examples of suitable starting components include ethylene glycol, propylene glycol-(1,3) or -(1,2), trimethylolpropane, aniline, ethanolamine, glycerine or the like. It is preferred to use polyethers which contain predominant amounts of primary OH groups (i.e., more than 50% by weight based on all the OH groups present in the polyether). Mixtures of any of the polyethers noted above are also useful.

Component (c) of the present invention is a dispersion of a polyurea and/or polyhydrazodicarbonamide in an organic compound containing at least two hydroxyl groups. As noted earlier, these dispersions are known in the art, are commercially available, and have been described, e.g., in U.S. Pat. Nos. 3,325,421, 4,042,537; 4,089,835; 4,293,470, 4,296,213 and 4,374,209, the disclosures of which are herein incorporated by reference. In general, the dispersions useful herein are produced by reacting monofunctional, bifunctional or higher functional isocyanates with (a) polyamines containing primary and/or secondary amino groups and/or (b) hydrazines and/or hydrazides, in the presence of an organic compound which contains at least two hydroxyl groups. As is known and as described in the abovenoted U.S. patents, such dispersions can be produced having a wide range of solids contents. In general, the solids content of the dispersion itself will range from 1 to as high as 40 percent, and preferably from 5 to 40 percent by weight.

As noted previously, the dispersions are added to component (b) in an amount of from about 5 to about 40 percent by weight, preferably 10 to 30 percent, and more preferably from 15 to 20 percent, based on the combined weight of the polyether component (b) and the dispersion component (c). The total solids content of the mixture of component (b) and (c) must be from about 1 to about 8 percent by weight and is preferably from about 2 to about 6 percent by weight, and is most preferably from about 3 to about 4 percent by weight. It has been found that this relatively narrow range is essential to obtain both superior low temperature flex-fatigue resistance and improved green strength.

Another necessary component of the present invention is a compound selected from the group consisting of 1,4-butanediol, ethylene glycol and mixtures thereof. The amount of such material is from about 5 to about 15 percent by weight, and preferably from about 5 to about 10 percent, based on the total amount of components (b), (c) and (d). Again, this narrow range is essential to obtaining the improved results herein.

According to the invention, water and/or readily volatile organic substances are used as blowing agents. Organic blowing agents include acetone, ethyl acetate, halogen-substituted alkanes, such as methylene chloride, chloroform, ethylidene chloride, vinylidene chloride, monofluorotrichloromethane, chlorodifluoromethane, and dichlorodifluoromethane, butane, hexane, heptane, diethyl ether and the like. A blowing effect may also be obtained by adding compounds such as azo-compounds which decompose at temperatures above room temperature giving off gases (such as nitrogen). A suitable azo-compound is azoisobutyronitrile. Further examples of blowing agents and information on the use of blowing agents may be found in Kunststoff-Handbuch, Vol. VII, Vieweg and Hochtlen, Carl-Hanser-Verlag, Munich, 1966, pages 108 and 109, 453 to 455 and 507 to 510.

In many cases, catalysts are also used in producing the foams in accordance with the invention. Suitable known catalysts include tertiary amines, such as triethylamine, tributylamine, N-methyl morpholine, N-ethyl morpholine, N-coco-morpholine, N,N,N',N'-tetramethyl ethylene diamine, 1,4-diazabicyclo-(2,2,2)-octane, N-methyl-N'-dimethyl amino ethyl piperazine, N,N-dimethyl benzylamine, pentamethyl diethylene triamine, N,N-dimethyl cyclohexylamine, N,N,N',N'-tetramethyl-1,3-butane diamine, N,N-dimethyl-$\beta$-phenylethyl amine, 1,2-dimethyl imidazole and 2-methylimidazole.

Tertiary amines containing isocyanate-reactive hydrogen atoms may also be used as catalysts and include N-methyl diethanolamine, N-ethyl diethanolamine, N,N-dimethyl ethanolamine, also their reaction products with alkylene oxides, such as propylene oxide and/or ethylene oxide. The use levels of such catalysts will be lower than for non-reactive catalysts.

Other suitable catalysts include sila-amines with carbon-silicon bonds of the type described, for example, in U.S. Pat. No. 3,620,984. Specific examples include 2,2,4-trimethyl-2-silamorpholine and 1,3-diethylaminomethyl tetramethyl disiloxane.

According to the invention, organometallic compounds and more especially organotin compounds may also be used as catalysts.

Preferred organotin compounds include tin mercaptide and tin (II) salts of carboxylic acids, such as tin (II) acetate, tin (II) octoate, tin (II) ethyl hexoate and tin (II) laurate, and tin (IV) compounds such as dibutyl tin oxide, dibutyl tin dichloride, dibutyl tin diacetate, dibutyl tin dilaurate, dibutyl tin maleate or dioctyl tin diacetate. It is of course, possible to use any of the abovementioned catalysts in the form of mixtures.

Further representatives of catalysts suitable for use in accordance with the invention and information on the way in which they work, may be found in Kunststoff-Handbuch, Vol. VII, by Vieweg-Hochtlen, Carl-Hanser-Verlag, Munich, 1966, for example on pages 96 to 102.

The catalysts are generally used in a quantity of from 0.001 to as high as 10% by weight based on the weight of components (b) and (c). In general, however, it is preferred to keep the catalyst content as low as possible for economic reasons.

According to the invention, it is also possible to use surface-active additives, such as emulsifiers and foam stabilizers.

Suitable foam stabilizers include polyether siloxanes, especially those which are water-soluble. These compounds are generally synthesized in such a way that a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the invention, it is also possible to use reaction retarders such as acid-reacting substances (e.g. hydrochloric acid or organic acid halides), cell regulators such as paraffins, fatty alcohols or dimethyl polysiloxanes, pigments, dyes, flame-proofing agents, such as trischloroethyl phosphate, tricresyl phosphate or ammonium phosphate and polyphosphate; stabilizers against ageing and weathering; plasticizers, fungistatic and bacteriostatic compounds and fillers, such as barium sulphate, kieselguhr, carbon black or whiting.

Other examples of surface-active additives, foam stabilizers, cell regulators, reaction retarders, stabilizers, flameproofing agents, plasticizers, dyes, fillers, and fungistatic and bacteriostatic compounds, optionally used in accordance with the invention, and also details on the way additives of this type are used and the way in which they work may be found in Kunststoff-Handbuch, Vol. VII, Vieweg and Hochtlen, Carl-Hanser-Verlag, Munich, 1966, pages 103–113.

According to the invention, the reaction components may be reacted by the known one-stage process, by the prepolymer process or by the semi-prepolymer process, in many cases using machines, for example, those of the type described in U.S. Pat. No. 2,764,565. Particulars of processing machines which may also be used in accordance with the invention may be found in Kunststoff-Handbuch, Vol. VII, Vieweg and Hochtlen, Carl-Hanser-Verlag, Munich, 1966, pages 121 to 205.

According to the invention, the products are often produced in molds. To this end, the reaction mixture is introduced into a mold. Suitable mold materials include metals (for example, aluminum) or plastics (for example, epoxide resin).

The products of the present invention are eminently suitable for the production of polyurethane shoe soles.

The present invention is illustrated by the following examples. Unless otherwise indicated, parts are parts by weight and percentages, percents by weight.

EXAMPLES

The following materials were used in the Examples:

(a) MMDI is a modified isocyanate prepared by reacting 4,4'-diisocyanatodiphenyl methane with tripropylene glycol, the resultant product having an NCO group content of about 23 percent by weight.

(b) Polyol A is a polyether diol having an OH number of about 28 and is prepared from propylene glycol, propylene oxide and ethylene oxide, the weight ratio of propylene oxide to ethylene oxide being about 4:1.

(c) Polyol B—is a polyether triol having an OH number of about 35 and is prepared from glycerin, propylene oxide and ethylene oxide, the weight ratio of propylene oxide to ethylene oxide being about 7:1.

(d) Dispersion—a dispersion having an OH number of about 28 and consisting of a polyhydrazodicarbonamide in a glycerin initiated propylene oxide/ethylene oxide polyether with an OH number of 35, and produced by reacting toluene diisocyanate and hydrazine hydrate in the presence of the polyether, according to U.S. Pat. No. 4,042,537. The dispersion has a solids content of 20 percent by weight.

(e) BD is 1,4-butanediol.

(f) EG is ethylene glycol.

(g) DABCO is triethylene diamine, commercially available from Air Products.

(h) T-12 is dibutyltin dilaurate.

(i) SO is a commercially available polydimethylsiloxane having a viscosity of 15,500 to 19,500 cps at 25° C.

(j) R-11-B is a stabilized monofluorotrichloromethane from Pennwalt.

The examples were carried out using a DESMA PSA 70 machine, a typical low pressure polyurethane shoe sole machine under the following processing parameters:

(a) temperatures of Component A, the MMDI: $25 \pm 2°$ C.;

(b) temperatures of Component B, i.e., the blend of polyether polyol, dispersion (when used), chain extender, catalysts, blowing agents, and surfactants: $25 \pm 2°$ C.;

(c) mixing screw speed: 18,000 rpm;

(d) mold temperature: 120°–130° F.;

(e) through-put: 50–60 g/sec.

The liquid reaction mixture was quickly poured into either a flat-heel unit sole mold or a $6'' \times 6'' \times \frac{1}{4}''$ plaque mold. All unit soles and plaques were molded at a density of $0.60 \pm 0.03$ g/cc.

The green strength of the unit soles which were demolded from the mold at specified demold times was judged according to postblow, and/or if the unit soles were easily deformed by bending and squeezing.

Rossflex was measured according to ASTM D-1052 except that the thickness of specimens were $0.415 \pm 0.020$ inch (instead of 0.250 in.), and the testing temperature was 0° F. (instead of $-20°$ F.). All Rossflex specimens were die cut from the unit soles.

The $\frac{1}{4}''$ thick plaques were used to measure the shore A hardness (ASTM D-2240), the tensile strength and the elongation at break (ASTM D-412). The split tear strength of $\frac{1}{4}''$ plaques was measured according to ASTM D-3574, Test F with the following exceptions:

(a) The size of specimen was $1'' \times 4'' \times \frac{1}{4}''$.

(b) The specimen was horizontally sliced along the longitudinal axis of the specimen. The cut was 1" long.

(c) The specimen was then torn at the rate of 2 in. per minute on an Instron tester.

A series of polyol blends were prepared by mixing the components noted in TABLE 1. The resultant polyol blends had the solids contents noted in TABLE 1.

TABLE 1

| Polyol Blend # | POLYOL BLENDS |||||||| 
| | CONTROL ||||||||
| | I | II | III | IV | V | VI | VII | VIII |
| POLYOL A (parts by weight) | 78.5 | 88 | 85 | 82 | 78.5 | 75 | 70 | 83.5 |
| POLYOL B (parts by weight) | 21.5 | — | — | — | — | — | — | — |
| DISPERSION (parts by weight) | — | 12 | 15 | 18 | 21.5 | 25 | 30 | 16.5 |
| SOLIDS CONTENT OF | 0 | 2.4 | 3.0 | 3.6 | 4.3 | 5.0 | 6.0 | 3.3 |

TABLE 1-continued

| Polyol Blend # | POLYOL BLENDS | | | | | | | |
|---|---|---|---|---|---|---|---|---|
| | | | | CONTROL | | | | |
| | I | II | III | IV | V | VI | VII | VIII |
| BLEND % by weight | | | | | | | | |

EXAMPLES 1 THROUGH 7

A series of B-sides were prepared by blending 86.45 parts by weight of each of Polyol Blends I through VII with 6.7 parts of 1,4-butanediol, 0.58 parts of Dabco, 0.02 parts of T-12, 0.14 parts of water, 6.03 parts of R-11-B, and 0.08 parts of SO. Each B-side was then reacted with the MMDI at the isocyanate indexes shown in Table 2. The products were tested, with the results set forth in Table 2. The data reported illustrates the effect of solids content on final properties.

EXAMPLE 8

Use of Ethylene Glycol 88.05 parts of Polyol Blend VIII, 4.61 parts of ethylene glycol, 0.58 parts of Dabco, 0.02 parts of T-12, 0.14 parts of water, 6.04 parts of R-11-B, and 0.08 parts of SO were blended to form a B-side. The B-side was then reacted at the various isocyanate indexes shown in Table 3 with the MMDI. The resultant products were tested with the results shown in Table 3.

TABLE 3

| Example # | 8A | 8B | 8C | 8D |
|---|---|---|---|---|
| ISOCYANATE INDEX | 95 | 98 | 100 | 103 |
| Green Strength @ 3 minute demold | Good | Good | Good | Fair |
| ROSSFLEX @ 0° F., cycles (10³) | 150 | 150 | 150 | 150 |
| Cut (%) | 0 | 0 | 0 | 0 |
| Hardness (Shore A) | 45 | 47 | 50 | 51 |
| Tensile (psi) | 440 | 540 | 540 | 560 |
| Elongation (%) | 520 | 530 | 470 | 450 |

TABLE 2

| Example No. | 1 | | | | | 2 | | | | 3 | | | | 4 | | | |
|---|---|---|---|---|---|---|---|---|---|---|---|---|---|---|---|---|---|
| Polyol Blend | I | | | | | II | | | | III | | | | IV | | | |
| Solids Content of Blend | 0 | | | | | 2.4 | | | | 3.0 | | | | 3.6 | | | |
| Isocyanate Index | 95 | 99 | 102 | 104 | 94 | 97 | 100 | 104 | 95 | 98 | 100 | 104 | 95 | 98 | 100 | 104 |
| Green Strength @ 3 minutes Demold | Bad with Sinking | Good | Good | Bad with Post-blow | Bad with Post-blow | Fair | Fair | Bad | Fair | Good | Good | Fair | ←Good→ | | | |
| Rossflex @ 0° F. cycles (10³) | 150 | 110 | 43 | 55 | ←150→ | | | | ←150→ | | | | 150 | 150 | 150 | 140 |
| Cut % | 0 | 900 | 900 | 900 | 0 | 0 | 0 | 100 | ←0→ | | | | 0 | 0 | 450 | 900 |
| Hardness (Shore A) | 43 | 46 | 50 | 52 | 48 | 50 | 52 | 53 | 45 | 48 | 50 | | 50 | 45 | 48 | 50 | 52 |
| Tensile (psi) | 500 | 550 | 580 | 620 | 300 | 410 | 590 | 620 | 400 | 600 | 650 | | 600 | 500 | 550 | 600 | 600 |
| Elongation (%) | 480 | 450 | 460 | 440 | 290 | 460 | 590 | 520 | 430 | 510 | 500 | | 470 | 490 | 460 | 450 | 440 |
| Split Tear (pli) | 19 | 16 | 15 | 12 | 17 | 22 | 22 | 17 | 18 | 16 | 14 | | 13 | 18 | 16 | 14 | 13 |

| Example No. | 5 | | | | 6 | | | | 7 | | | |
|---|---|---|---|---|---|---|---|---|---|---|---|---|
| Polyol Blend | V | | | | VI | | | | VII | | | |
| Solids Content of Blend | 4.3 | | | | 5.0 | | | | 6.0 | | | |
| Isocyanate Index | 94 | 98 | 101 | 103 | 94 | 98 | 100 | 103 | 95 | 97 | 100 | 104 |
| Green Strength @ 3 minutes Demold | ←Good→ | | | | ←Good→ | | | | ←Good→ | | | |
| Rossflex @ 0° F. cycles (10³) | 150 | 110 | 53 | 73 | 150 | 150 | 150 | 31 | 130 | 92 | 45 | 22 |
| Cut % | 0 | 900 | 900 | 900 | 0 | 50 | 550 | 900 | 900 | 900 | 900 | 900 |
| Hardness (Shore A) | 46 | 50 | 49 | 50 | 48 | 50 | 51 | 53 | 53 | 53 | 54 | 55 |
| Tensile (psi) | 600 | 700 | 600 | 700 | 520 | 580 | 590 | 590 | 600 | 600 | 600 | 600 |
| Elongation (%) | 460 | 450 | 390 | 380 | 520 | 480 | 470 | 430 | 410 | 400 | 370 | 370 |
| Split Tear (pli) | 18 | 15 | 16 | 15 | 16 | 15 | 14 | 14 | 17 | 16 | 13 | 13 |

TABLE 3-continued

| Example # | 8A | 8B | 8C | 8D |
|---|---|---|---|---|
| Split Tear (pli) | 18 | 21 | 21 | 18 |

EXAMPLES 9 THROUGH 12

Variation of Butanediol Level

A series of B-sides were prepared by blending the materials noted in Table 4 in the amounts shown.

As can be seen, the level of chain extender is the major variation in each formulation.

TABLE 4

| EXAMPLE NUMBER | 9 | 10 | 11 | 12 |
|---|---|---|---|---|
| POLYOL BLEND III | — | — | — | 79.54 |
| POLYOL BLEND VIII | 86.98 | 85.64 | 84.48 | — |
| BD | 6.16 | 7.50 | 9.12 | 13.60 |
| DABCO | 0.58 | 0.58 | 0.48 | 0.48 |
| T-12 | 0.02 | 0.02 | 0.012 | 0.012 |
| Water | 0.14 | 0.14 | 0.06 | 0.14 |
| R-11-B | 6.04 | 6.04 | 5.76 | 6.04 |
| SO | 0.08 | 0.08 | 0.08 | 0.08 |

Each B-side was then reacted with the MMDI at the isocyanate indexes noted in Table 5. The products were tested and the results are as shown in Table 5.

TABLE 5

| Example # | 9 | | | | 10 | | | | 11 | | | | 12 | | | |
|---|---|---|---|---|---|---|---|---|---|---|---|---|---|---|---|---|
| Isocyanate Index | 94 | 96 | 100 | 103 | 94 | 97 | 100 | 103 | 95 | 97 | 101 | 103 | 96 | 98 | 102 | 104 |
| Green Strength @ demold time | Fair | Good | Good | Fair | ←Good→ | | | | Good | Good | Good | Fair | ←Good→ | | | |
| | | 3 minutes | | | | 2½ minutes | | | | 2½ minutes | | | | 2 minutes | | |
| Rossflex @ 0° F. | | | | | | | | | | | | | | | | |
| cycles (10³) | | ←150→ | | | 150 | 150 | 120 | 90 | 150 | 150 | 80 | 61 | .155 | .025 | .025 | .025 |
| cut (%) | | ←0→ | | | 0 | 0 | 900 | 900 | 60 | 250 | 900 | 900 | ←900→ | | | |
| Hardness (Shore A) | 45 | 46 | 46 | 47 | 56 | 60 | 61 | 59 | 69 | 70 | 74 | 74 | 84 | 86 | 89 | 90 |

EXAMPLE 13:

COMPARATIVE

A B-side was prepared, using 84.48 parts of Polyol Blend I, 9.12 parts of 1,4-butanediol, 0.48 parts of Dabco, 0.012 parts of T-12, 0.06 parts of water, 5.76 parts of R-11-B, and 0.08 parts of SO. The B-side was then reacted with the MMDI at the isocyanate indexes shown in Table 6. The products were tested, with the results set forth in Table 6. For comparison purposes, the data for Example 11 is included in Table 6.

TABLE 6

| EXAMPLE | 13A | 13B | 13C | 13D | 11A | 11B | 11C | 11D |
|---|---|---|---|---|---|---|---|---|
| POLYOL BLEND | I | I | I | I | VIII | VIII | VIII | VIII |
| ISOCYANATES INDEX | 94 | 98 | 100 | 103 | 95 | 97 | 101 | 103 |
| Green Strength @ 2/12 minutes demold | Good | Good | Good | Good | Good | Good | Good | Fair |
| Rossflex @ 0° F. cycles (10³) | 12 | 31 | 13 | 14 | 150 | 150 | 80 | 61 |
| Cut (%) | 900 | 900 | 900 | 900 | 60 | 250 | 900 | 900 |

What is claimed is:

1. A polyurethane product formed by reacting
   (a) an isocyanate selected from the group consisting of 4,4'-diisocyanatodiphenylmethane, isocyanates based on 4,4'-diisocyanatodiphenylmethane, and mixtures thereof,
   (b) at least one polyether polyol having at least two and no more than three hydroxyl groups,
   (c) from about 5 to about 40 percent by weight based on the total weight of components (b) and (c) of a dispersion of a polyurea and/or a polyhydrazodicarbonamide in an organic compound containing at least two hydroxyl groups, and wherein the total solids content of the mixture of component (b) and component (c) is from about 1 to 8 parts by weight, and
   (d) from about 5 to about 15 percent by weight based on the total weight of components (b), (c) and (d) of a compound selected from the group consisting of ethylene glycol, 1,4-butanediol, and mixtures thereof, in the presence of
   (e) a blowing agent, and, optionally catalyst and surfactant, wherein the amount of component (a) is such that the isocyanate index is from about 94 to about 105.

2. The product of claim 1, wherein component (c) comprises from about 10 to about 30 percent by weight based on the total weight of component (b) and component (c).

3. The product of claim 2, wherein the total solids content of the mixture of component (b) and component (c) is from about 2 to about 6 percent by weight.

4. The product of claim 2, wherein component (c) comprises from about 15 to about 20 percent by weight based on the total weight of component (b) and component (c).

5. The product of claim 4, wherein the total solids content of the mixture of component (b) and component (c) is from about 3 to about 4 percent by weight.

6. The product of claim 1, wherein component (d) comprises from about 5 to about 10 percent by weight based on the total weight of components (b), (c) and (d).

7. A process for the production of a polyurethane product comprising reacting
   (a) an isocyanate selected from the group consisting of 4,4'-diisocyanatodiphenylmethane, isocyanates based on 4,4'-diisocyanatodiphenylmethane, and mixtures thereof,
   (b) at least one polyether polyol having at least two and no more than three hydroxyl groups,
   (c) from about 5 to about 40 percent by weight based on the total weight of components (b) and (c) of a dispersion of a polyurea and/or a polyhydrazodicarbonamide in an organic compound containing at least two hydroxyl groups, and wherein the total solids content of the mixture of component (b) and component (c) is from about 1 to 8 parts by weight, and
   (d) from about 5 to about 15 percent by weight based on the total weight of components (b), (c) and (d) of a compound selected from the group consisting of ethylene glycol, 1,4-butanediol, and mixtures thereof, in the presence of
   (e) a blowing agent, and, optionally catalyst and surfactant, wherein the amount of component (a) is such that the isocyanate index is from about 94 to about 105.

8. The process of claim 7, wherein component (c) comprises from about 10 to about 30 percent by weight based on the total weight of component (b) and component (c).

9. The process of claim 8, wherein the total solids content of the mixture of component (b) and component (c) is from about 2 to about 6 percent by weight.

10. The process of claim 8, wherein component (c) comprises from about 15 to about 20 percent by weight based on the total weight of component (b) and component (c).

11. The process of claim 10, wherein the total solids content of the mixture of component (b) and component (c) is from about 3 to about 4 percent by weight.

12. The process of claim 7, wherein component (d) comprises from about 5 to about 10 percent by weight based on the total weight of components (b), (c) and (d).

13. A polyol blend comprising
   (b) at least one polyether polyol having at least two and no more than three hydroxyl groups, and
   (c) from about 5 to about 40 percent by weight based on the total weight of components (b) and (c) of a dispersion of a polyurea and/or a polyhydrazodicarbonamide in an organic compound containing at least one hydroxyl group, the solids content of said blend being from about 1 to about 8 percent by weight.

14. The blend of claim 13, wherein component (c) comprises from about 10 to about 30 percent by weight based on the total weight of component (b) and component (c).

15. The blend of claim 14, wherein the total solids content of the mixture of component (b) and component (c) is from about 2 to about 6 percent by weight.

16. The blend of claim 14, wherein component (c) comprises from about 15 to about 20 percent by weight based on the total weight of component (b) and component (c).

17. The blend of claim 16, wherein the total solids content of the mixture of component (b) and component (c) is from about 3 to about 4 percent by weight.

18. A blend comprising
   (b) at least one polyether polyol having at least two and no more than three hydroxyl groups,
   (c) from about 5 to about 40 percent by weight based on the total weight of components (b) and (c) of a dispersion of a polyurea and/or polyhydrazodicarbonamide in an organic compound containing at least one hydroxyl group, and wherein the total solids content of the mixture of component (a) and component (b) is from about 1 to about 8 percent by weight, and
   (d) from about 5 to about 15 percent by weight based on the total weight of components (b), (c), and (d) of a compound selected from the group consisting of ethylene glycol, 1,4-butanediol, and mixtures thereof,
   (e) a blowing agent, and, optionally catalyst and surfactant.

19. The blend of claim 18, wherein component (c) comprises from about 10 to about 30 percent by weight based on the total weight of component (b) and component (c).

20. The blend of claim 19, wherein the total solids content of the mixture of component (b) and component (c) is from about 2 to about 6 percent by weight.

21. The blend of claim 19, wherein component (c) comprises from about 15 to about 20 percent by weight based on the total weight of component (b) and component (c).

22. The blend of claim 21, wherein the total solids content of the mixture of component (b) and component (c) is from about 3 to about 4 percent by weight.

23. The blend of claim 18, wherein component (d) comprises from about 5 to about 10 percent by weight based on the total weight of components (b), (c) and (d).

* * * * *